United States Patent [19]
Korpela

[11] Patent Number: 5,946,634
[45] Date of Patent: Aug. 31, 1999

[54] MOBILE COMMUNICATIONS

[75] Inventor: Mikko Korpela, Raahe, Finland

[73] Assignee: Nokia Mobile Phones Limited, Espoo, Finland

[21] Appl. No.: 08/996,929

[22] Filed: Dec. 23, 1997

[30] Foreign Application Priority Data

Jan. 2, 1997 [EP] European Pat. Off. .............. 97300015

[51] Int. Cl.$^6$ .................................................. H04M 11/00
[52] U.S. Cl. .......................... 455/552; 455/553; 370/466; 370/467; 370/469
[58] Field of Search ..................................... 455/556, 557, 455/552, 553, 575, 74, 426; 370/467, 466, 469

[56] References Cited

U.S. PATENT DOCUMENTS

| | | | |
|---|---|---|---|
| 5,640,686 | 6/1997 | Norimatsu .................................. | 455/74 |
| 5,732,359 | 3/1998 | Baranowsky, II et al. .............. | 455/552 |
| 5,732,360 | 3/1998 | Jarett et al. ................................ | 455/552 |
| 5,761,623 | 6/1998 | Lupien et al. ............................ | 455/552 |

FOREIGN PATENT DOCUMENTS

| | | |
|---|---|---|
| 2 292 047 | 2/1996 | United Kingdom . |
| 2 294 844 | 8/1996 | United Kingdom ............. H04Q 7/38 |
| WO 96/28947 | 9/1996 | WIPO . |

OTHER PUBLICATIONS

Bilgic, Murat, "A PCS Terminal Architecture To Access Multiple Networks", 1996 IEEE 46$^{th}$ Vehicular Technology Conf., Apr. 28, 1996, vol. 2, pp. 1160–1164.

"Telecommunications Engineers Reference Book" edited by Fraidoon Mazda, Butterworth Heinemann, 1993, Chapter 41, paragraphs 41.4.6–41.4.13.

*Primary Examiner*—Wellington Chin
*Assistant Examiner*—Isaak R. Jama
*Attorney, Agent, or Firm*—Perman & Green, LLP

[57] ABSTRACT

A mobile terminal (10) has multiple alternative protocol stacks (151, 152 . . .) which correspond to the protocols used on multiple backbone networks (30*a*–30*c*) to which the mobile terminal can obtain access through one or more radio access networks (20*a*–20*c*) with which it is in communication using a common, predetermined low level signalling protocol. The radio access network (20) broadcasts signals (102) indicating the types of backbone network to which it is connected (and thereby the protocols they employ), and on encountering a signal indicating a new type of backbone network, a mobile terminal 10 may download a new protocol stack from the radio access network.

25 Claims, 5 Drawing Sheets

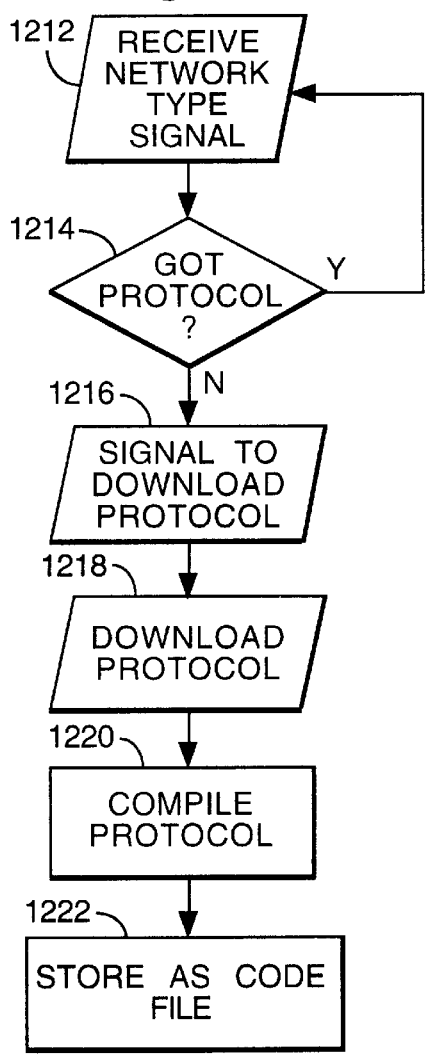
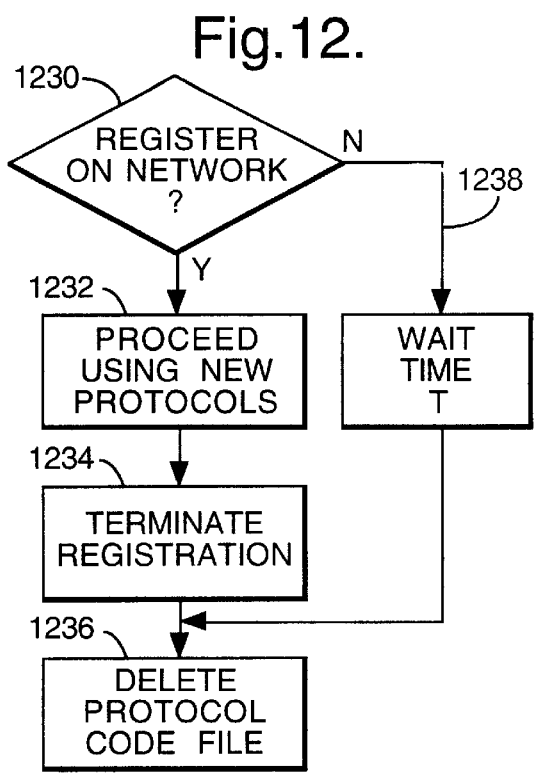
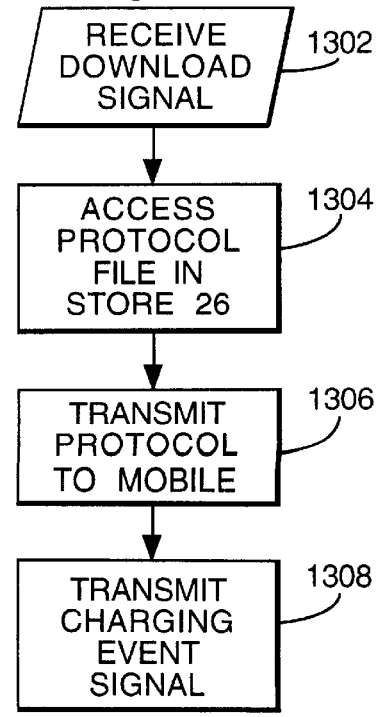

MOBILE COMMUNICATIONS

FIELD OF INVENTION

The present invention relates to mobile communications.

BACKGROUND TO INVENTION

At present, several different, and incompatible, mobile communications specifications exist for different territories; for example, the GSM specification in Europe and elsewhere, and the D-AMPS specification in the US. Although a mobile terminal which conforms to one specification may be able to operate with different networks provided they all conform to that specification and they have so-called "roaming" agreements, the mobile terminal is not able to operate with networks which conform to a different specification. Thus, a GSM phone will not be useable in many parts of the US.

Mobile telephony networks such as GSM consist of base transceiver stations (BTSs) which are in radio communication with the mobiles; base control stations (BSCs) connected to the BTSs, and which manage low level signalling control functions such as local handover; and mobile switching centres (MSCs) which act as switching exchanges, and are usually co-located with mobility management databases.

These MSC's, together with the physical links (e.g. fibre optic cables) which interconnect them, make up a backbone network, through which voice calls, fax calls or data exchanges (hereafter collectively termed "sessions") are routed after leaving the air interface at the BTS. The signalling protocols used on the backbone network are specified within the GSM specification, and bear some similarity to those of the integrated services digital network (ISDN).

One prior proposal is disclosed in our earlier application WO 96/28947, which describes a multi-mode universal mobile telecommunications system, in which a multiple access satellite communication system is provided to co-operate with multimode terminals which can operate according to several different communications standards. In this case, both high level and low level protocols employed, and even the radio frequencies employed, by the various different terrestrial and satellite communications systems envisaged, may differ between the different systems. Other aspects of our earlier proposal may be employed together with the present invention as described hereafter.

At present, discussions are taking place on the future generation of mobile communications systems, termed the universal mobile telecommunications system (UMTS), but no standards or specifications have been settled. It appears likely that the UMTS will specify a radio interface and a radio access network, but will not specify a unique backbone network as GSM does.

SUMMARY OF THE INVENTION

In one aspect, the present invention is primarily concerned with mobile communications in which multiple backbone networks are accessible via one or more common protocol radio access networks, and the backbone networks operate using technically incompatible communications protocols.

One way of implementing such systems would be to provide a full set of protocol converters within the radio access network (for example, at a point corresponding to the BCS of a GSM network) and to allow the mobile terminal to communicate using a single stack of high and low level protocols. Protocol conversion would then be handled invisibly from the mobile terminal, which could be of simple construction. This is the approach which has in the past been used, for example, when specifying the interworking between DECT (digital European cordless telephony) and GSM systems.

However, we have realised that as the number of new types of network grows, the complexity of a unit to perform such conversions rises steeply.

Accordingly, in one aspect, we provide a mobile communications system in which a mobile terminal is adapted to communicate in a common physical layer format (e.g. radio access format), and to utilise two or more different higher level communication protocols (corresponding to those utilised by different backbone networks), and further includes a control device for selecting one of said higher level formats.

This enables greater flexibility, and/or simpler construction, of the radio access network.

At this point, it may be mentioned that GB-A-2292047 discloses a mobile telephone handset which includes software for implementing different network features such as voice mail, implemented on substantially compatible (e.g. GSM) networks. The selection of which features to use is determined by the plug-in subscriber identity module (SIM).

In another aspect the present invention provides a mobile communications system in which physical layer network components (e.g. the radio access network, comprising base station equipment) are arranged to transmit signals identifying to which of a plurality of different backbone networks they are connected or connectable. In this aspect, the mobile terminal is thereby able to select one of a plurality of different higher level protocols for data transmission over the physical layer, and to select a corresponding one of said backbone networks for communication, in dependence upon the transmitted network identifier signals.

For example, the backbone networks may comprise GSM networks, GSM evolutionary networks, or broadband ISDN (B-ISDN) networks.

It is envisaged that networks may evolve over time, so that a mobile terminal with preset communications protocols would, at best, be unable to make full use of the available networks and, at worst, might only be able to communicate through backbone networks which were being superseded.

Accordingly, in preferred embodiments, the mobile terminal is arranged to be reprogrammable to use new communications protocols corresponding to new or amended backbone network communications protocols.

It would be possible to reprogram each mobile terminal by returning it to the factory, or by substituting a new memory component (for example, on a subscriber identity module (SIM) or the like, as suggested in GB-A-2292047).

However, in a preferred embodiment, we provide a mobile terminal which is arranged to download data relating to new communications protocols via the physical layer (e.g. radio access network).

In one preferred embodiment, the data relating to the protocols comprises code specifying how the protocols should be implemented, and this is preferably in a machine-independent descripter language such as SDL; in this case, the mobile terminal includes a compiler and/or interpreter program for converting the high level description to low level machine instructions.

Preferably, the mobile terminal and the fixed network components are arranged to perform signalling dialogue to automatically download data relating to new communications protocols when the transmitted signal indicating the backbone networks to which the radio access network is connected identifies a backbone network of a type not previously encountered by the mobile terminal.

Other aspects and preferred embodiments of the invention will be apparent from the following description and drawings.

BRIEF DESCRIPTION OF THE DRAWINGS

FIG. 10 is a flow diagram showing the process performed by the terminal of FIG. 2 in downloading a new protocol;

FIG. 11 is a flow diagram showing the corresponding steps performed by the radio access network of FIG. 3 in downloading a new protocol to the mobile terminal of FIG. 2; and FIG. 12 is a flow diagram showing the steps performed by the mobile terminal 10 in erasing a downloaded protocol.

DETAILED DESCRIPTION OF EMBODIMENTS OF THE INVENTION

Embodiments of the invention will now be illustrated, by way of example only, with reference to the accompanying drawings.

Figure 1:
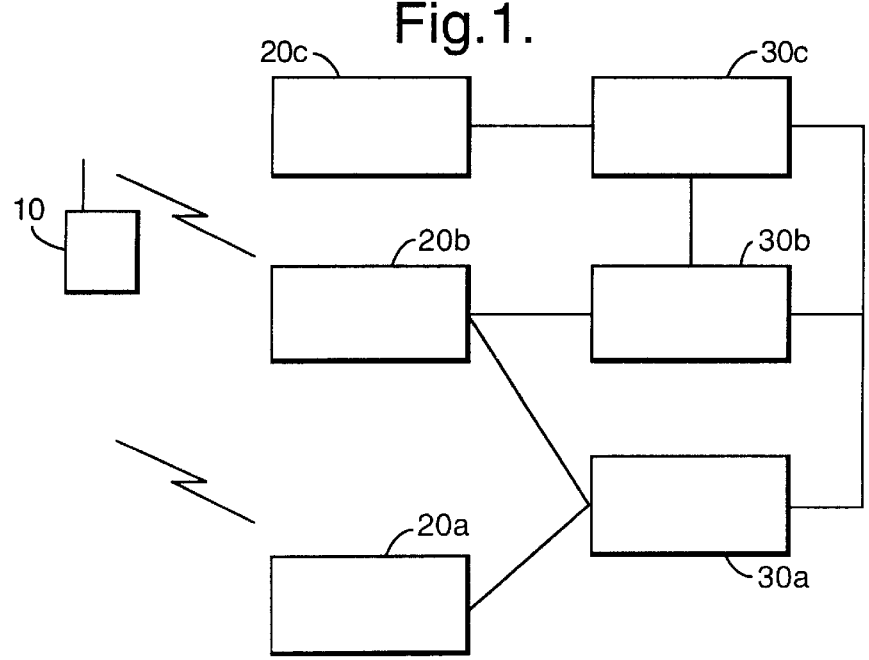
FIG. 1 is a block diagram showing elements of a communication system according to an embodiment of the invention.

Referring to FIG. 1, a mobile communications system comprises a mobile terminal 10 (e.g. a digital cellular telephone or personal digital assistant (PDA)); three radio access networks 20a;20b;20c and three backbone networks 30a,30b,30c.

Figure 2:
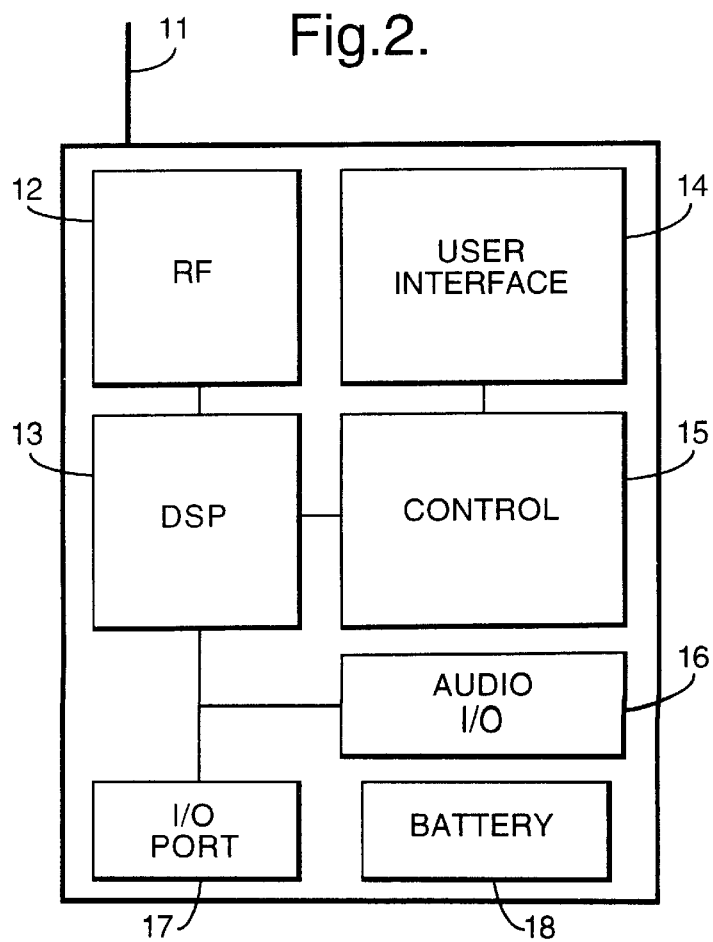
FIG. 2 is a block diagram showing in greater detail elements of a mobile terminal forming part of the embodiment of FIG. 1.

Referring to FIG. 2, in this embodiment, the mobile terminal 10 comprises an RF antenna 11; an RF (analog) transceiver circuit 12; a digital signal processing circuit 13; a user interface section 14 comprising, for example, an LCD screen and keypad (neither of which is shown for clarity); a control circuit 15; an audio interface 16 comprising a loud speaker and a microphone; an input/output port for digital data 17; and a battery 18.

In use, the digital signal processor device 13 operates in one of several different modes under control of the control device 15, to selectively interconnect either the data input/output port 17 or the audio interface 16 with the RF circuit 12, to set up either a voice or a data communication session. The digital signal processor device 13 performs data formatting (for example into packets, ATM cells or a TDM bit stream and into a frame structure); data encryption; redundancy reduction encoding and decoding; and other functions which are of themselves known.

The RF section 12 receives the output bit stream from the digital signal processing device 13 and modulates this onto an RF channel comprising, for example, one or more time slots on one or more frequency carriers or one or more codes in a CDMA system.

Figure 3:
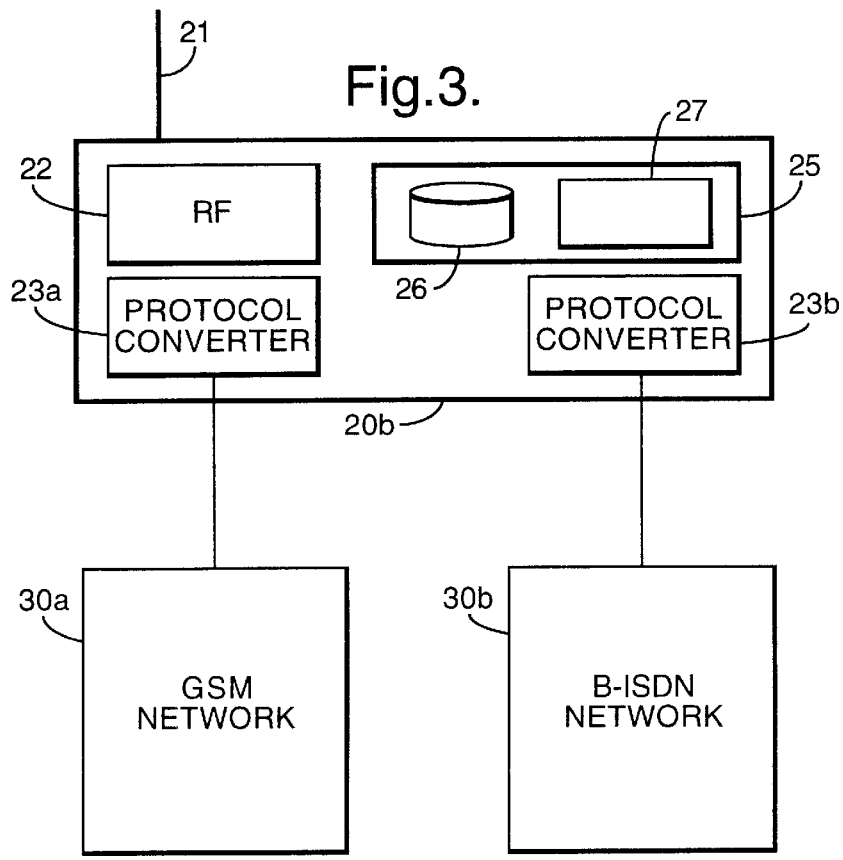
FIG. 3 is a block diagram showing in greater detail elements of a radio access network station forming part of the embodiment of FIG. 1.

Referring to FIG. 3, each radio access network comprises one or more base stations 20 comprising an antenna 21; an RF section 22; a first protocol conversion device 23a; optionally, a second protocol conversion device 23b; and a control device 25 comprising a store 26 (e.g. a hard disc drive) and a control unit 27 (e.g. a mainframe computer).

Although only a single antenna 21 is shown, the station 20b may comprise several antennas 21 at separate locations each defining a communications cell.

Via the antenna 21, the RF circuit 22 is in communication with one or more mobile terminals 10 to transmit data to and receive data from each terminal. The control processor 27 is arranged to control the RF circuit 22 so as to assign RF channels to mobile terminals 10 for the duration of a session; and to perform handover of mobile terminals 10 (for example, between different cells defined by different antennas 21).

Thus, the RF circuit 22 and control device 27 are arranged between them to perform low-level, radio interface dependent parts of the signal processing, signalling and control protocols, corresponding to layers 1 and 2 (physical and datalink layers, in terms of the OSI reference model of ISO 7498) and the RR sublayer.

The radio access network station 20b shown in FIG. 3 is connected to two alternative backbone networks; a GSM backbone network 30a and a broadband ISDN (B-ISDN) backbone network 30b. B-ISDN is discussed in, for example, the Telecommunications Engineers Reference Book edited by Fraidoon Mazda published by Butterworth Heinemann, 1993, at Chapter 41, paragraphs 41.4.6–41.4.13. It consists, in essence, of a TDM structure in which time slots are occupied by ATM cells comprising 48 bytes of data and 5 bytes of header information.

The protocol converter 23a (which may, in practice, be provided by the control processor 27 operating under suitable program control) is arranged to provide the "stack" of higher layer protocols (for example the network layer protocols and above) mapping the data received from or supplied to the RF section into the format used by the GSM network 30a or B-ISDN network 30b respectively and adding new control signals. Each session is routed between the RF section 22 and one or other of the protocol converters 23a or 23b by the control processor 27.

Figure 4:
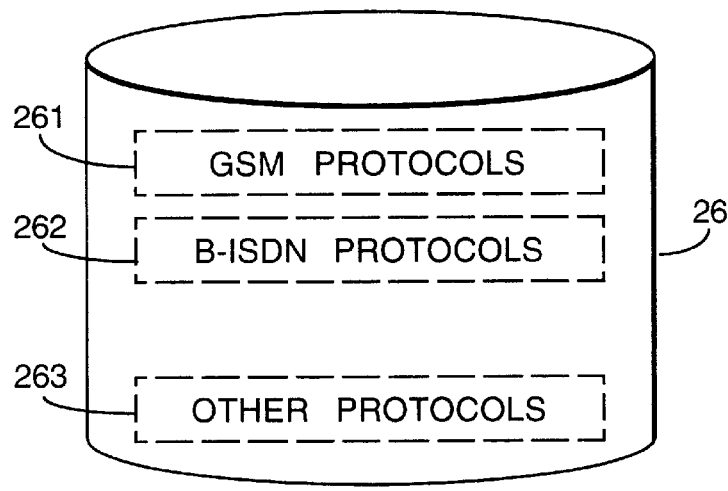
FIG. 4 is a block diagram showing in greater detail the contents of a store forming part of FIG. 3.

Referring to FIG. 4, the store 26 contains one or more protocol records (261 . . . 263). Each protocol record contains a description of the protocols used in a respective corresponding backbone network; for example, as shown, record 261 contains a description of the stack of higher level (i.e. backbone network dependent) protocols used in the GSM backbone network 30a; protocol record 262 contains a description of the higher level protocols used in the B-ISDN network 30b; and, where other networks are connected to the radio access network, each has a corresponding other protocol record (shown as 263 in FIG. 4).

Within each protocol record, in this embodiment, is a description of the protocols of the stack written in the CCITT specification description language (SDL), or a similar design language. Such a specification is relative compact, because it is written in a high level language, and it is also independent of the mobile terminal hardware, but can be compiled directly to a low level operating program by each mobile terminal 10.

Figure 5:
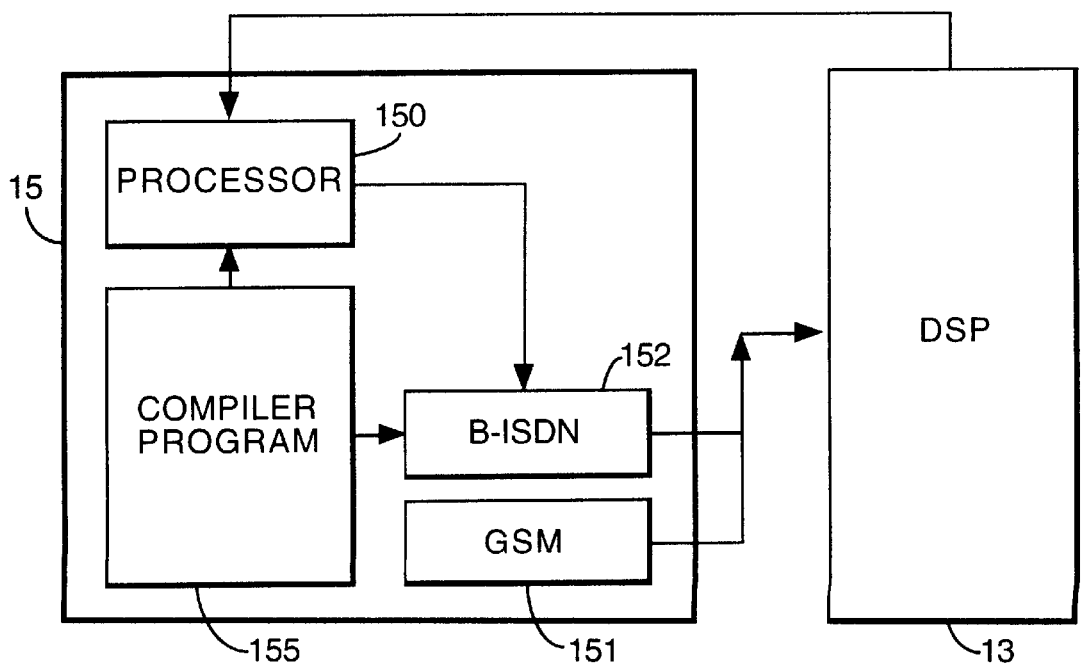
FIG. 5 is a block diagram showing in greater detail components of the mobile terminal of FIG. 2.

Referring to FIG. 5, the control device 15 comprises a processor 150 (e.g. an Intel Pentium (TM) processor), and memory containing a compiler program 155 and at least one protocol code file 151, 152 in electrically writable memory (e.g. EEPROM).

The code files 151, 152 each contain executable code for performing a respective set of protocols (e.g. GSM protocols in file 151 and B-ISDN protocols in file 152) by the DSP device 13, which is connected to read, and to be controlled by, a selected one of the protocol code files 151, 152. Alternatively, the processor 150 may perform the set of protocols.

Figure 6:
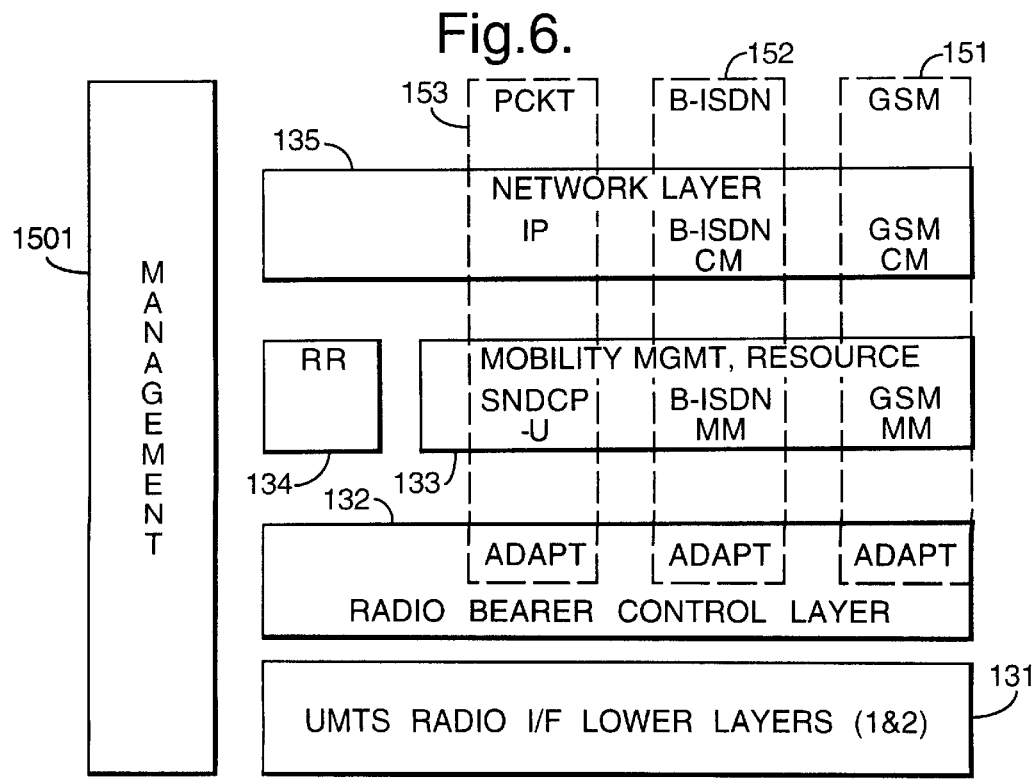
FIG. 6 is a schematic diagram illustrating the functional structure of the protocol stack and other communications software present in the block diagram of FIG. 5.

FIG. 6 illustrates schematically the content of the protocol code files 151, 152 and their relation with other elements of the signalling control software within the terminal 10. Under the control of a management program (provided by the processor 150) the DSP device 13 selectively applies one of the protocol code files 151, 152, 153, in combination with code 131 which implements layers 1 and 2 (the physical layer, the logical link sub-layer and the link control MAC layer) of the radio access system.

Also provided are code implementing a radio bearing control layer 132, which may provide protocols to set up and manage sessions by negotiating the necessary bearer capacities (byte rate, quality of service and so on) between the requirements of the terminal user and those of the radio access network 20; and a radio resource protocol 134 for performing signal quality measurements and enacting handover decisions.

Each of the protocol code files 151–153 comprises a network layer portion for performing backbone network dependent protocols; a mobility management layer for performing mobility management and other resource functions; and an adaption component forming part of the radio bearer control layer 132, which provides the radio bearer control layer 132 with protocol conversions for communicating with the mobility management/resource layer component of that protocol code file.

Thus, the GSM code protocol file 151 contains a GSM connection management (CM) layer, and a GSM mobility management (MM) layer, together with a GSM adaption component portion of the radio bearer control layer 132; the B-ISDN protocol code file 152 comprises a B-ISDN CC component, a B-ISDN MM component; and a B-ISDN adaptation component, and a packet communications protocol file 153 comprises an internet protocol (IP) component; an SNDCP-U packet radio component; and a adaptation component.

Each component of each protocol file therefore corresponds to a separate layer protocol, and communicates with the layers above and below by the exchange of so-called "primitives" comprising signalling format messages containing data for communication.

Figure 7:
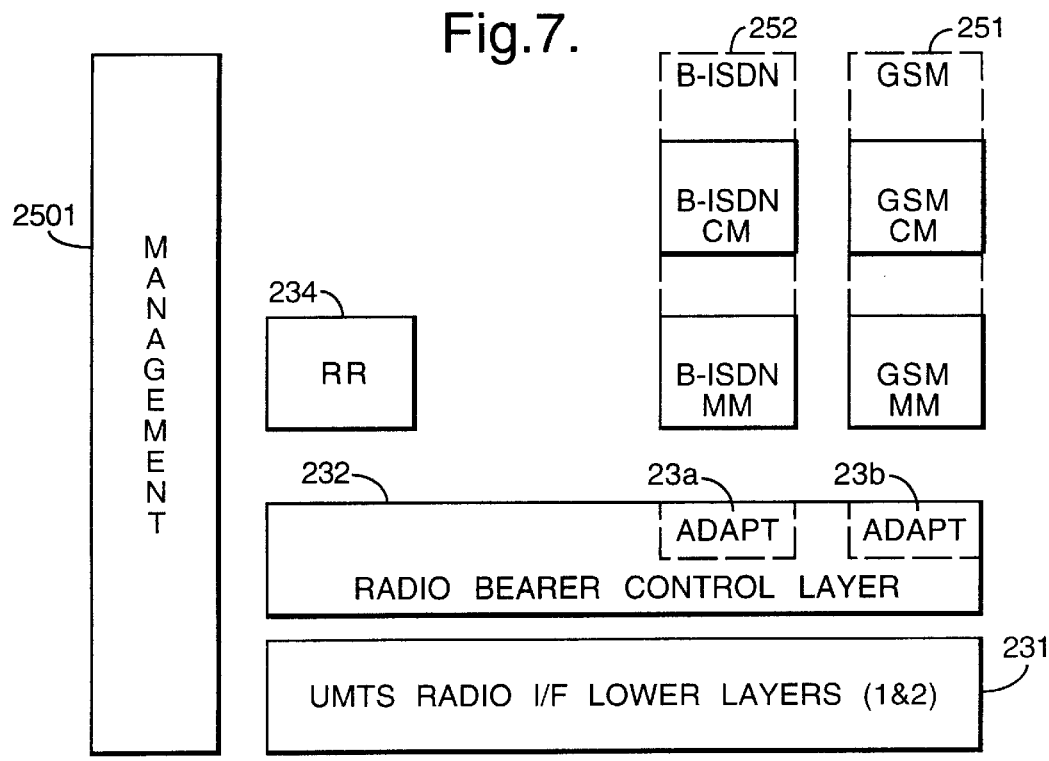
FIG. 7 corresponds to FIG. 6 and illustrates the functional components of the communications protocol software present in the radio access network of FIG. 3.

Referring to FIG. 7, within each radio access network 20 (e.g. at a BSC) are provided corresponding radio interface lower layer protocols 231, radio resource control protocols 234 and a radio bearer control layer 232. The radio bearer control layer protocol 232 communicates with the radio bearer control layer protocol 132 of the mobile terminal, and comprises a B-ISDN adaptation component 252 for communicating with a B-ISDN network 23b, and a GSM adaptation component 251 for communicating with a GSM network 23a. The radio bearer control layer, management device, and radio interface lower layers are all provided by the control unit 25.

The radio interface lower layers 131, 231 of the mobile terminal and the radio access network 20 communicate with each other via the antennas 11, 21 and, via the lower layers 131, 231, the radio bearer control layers 132, 232 and radio resource protocols 134, 234 communicate with each other to set up a session of the required bandwidth and to hand on the mobile terminal 10 when radio conditions require it.

Figure 8:
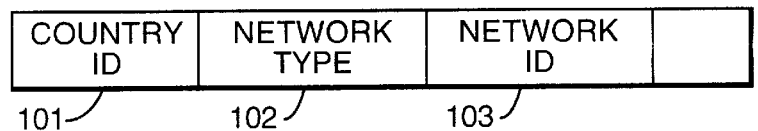
FIG. 8 illustrates the structure of a broadcast signal including a network type code utilised in the first embodiment.

Periodically, on a broadcast channel, the radio access network transmits signals (indicated in FIG. 8) comprising a country identification portion 101 (similar to the country-type code broadcast in GSM on the broadcast common control channel or BCCH); a network identifying portion 103 (similar to the PLMN code broadcast in GSM) indicating the identity of each backbone network 30 to which the radio access network is connected; and a backbone network type code 102 indicating, for each such backbone network, whether the network is, for example, a GSM network, a B-ISDN network; and so on.

Following each network type/network ID pair may be signalling data specific to that network; for example, mobility management messages such as location update request messages.

Figure 9:
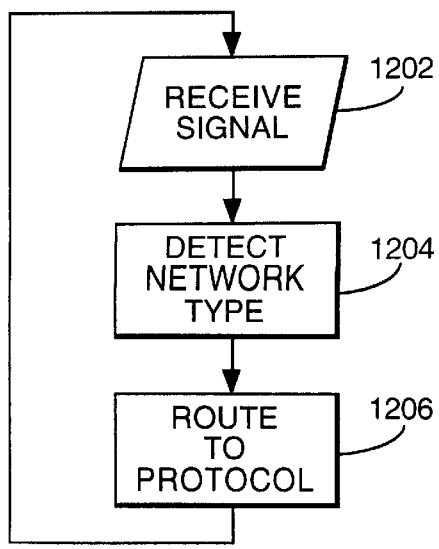
FIG. 9 is a flow diagram showing an initial stage of operation of the mobile terminal of FIG. 2.

Referring to FIG. 9, the mobile terminal 10 receives such broadcast signals in a step 1202; detects the network type code in a step 1204; and routes (step 1206) any following signals (e.g. mobility management signals) to the adaptation portion of the relevant protocol code file 151, 152 or 153. Thus, the radio bearer control level 132 passes to the protocol stack for each type of backbone network only the information relevant to that backbone network.

Referring to FIG. 10, in a step 1212, a mobile terminal 10 receives a network type signal 102 identifying a network type for which the mobile terminal 10 has no stored protocol code file 151,152 (step 1214).

In this case, the processor 150 signals back (step 1216) identifying the protocol type which it does not have, and in step 1218 the processor 150 receives, via the DSP device 13, the protocol file, in SDL, from the store 26 of the radio access network 20.

In step 1220, the processor 150 executes the compiler program 155 to compile the protocol from SDL into executable code suitable for operation on the DSP 13, and in step 1222 the processor 150 creates a new protocol code file and stores the executable code therein.

Referring to FIG. 11, the corresponding operation of the radio access network 20 will be apparent. In step 1302, the protocol download request signal is received from a mobile terminal 10, identifying the backbone network type for which the protocols are to be downloaded.

In step 1304, the processor 27 accesses the store 26 to read the SDL protocol description, which is transmitted to the mobile in step 1306 via the antenna 21. In a step 1308, in this embodiment, a charging event signal is transmitted by the radio access network to the network corresponding to the network type for which the protocol was downloaded, identifying the mobile terminal 10, to enable a charge to be made to the user of the mobile terminal 10 in respect of downloading of a protocol.

Referring to FIG. 12, if the terminal 10 registers on the network corresponding to the newly downloaded protocol file (step 1230), the session proceeds using the newly downloaded protocols (step 1232) until the registration is terminated, either because the or each session has been terminated or because the mobile terminal 10 has moved out of range (step 1234).

In this embodiment, at this stage (step 1236) the processor 150 deletes the newly downloaded protocol code file (151 or 152) (step 1236).

If the mobile terminal 10 does not immediately register on the network corresponding to the newly downloaded protocol, the processor 150 waits for a period T (step 1238) and if no registration has occurred within that period, it proceeds to step 1236 to delete the protocol code file.

Example of Use of the Invention

One example of the circumstances in which the invention may be used will now be described.

Referring to FIG. 1, a mobile terminal is in signalling communication with three radio access networks 20a–20c. The radio access networks may be UMTS networks or conventional networks. The first network 20c is connected to a GSM (or evolution thereof) backbone network 30c and the two are commonly owned. The mobile terminal 10 is registered with this GSM network. The second radio access network 20b is also a GSM (or evolution thereof) network and is connected to a GSM backbone network 30b. The two have a roaming agreement with the first network (20c, 30c) so that the mobile terminal 10 may use them.

The third backbone network 30a is a B-ISDN backbone network, which is connected to the second radio access network and accessible therethrough, and has a roaming agreement with the first GSM network (20c, 30c), so that the mobile terminal may use it. It is also accessible through an independently owned radio access network 20a.

As described above, the mobile terminal 10 may, in idle mode, detect the network identification and network type signals from all three backbone networks via each radio access network. It will contain a GSM protocol stack, and will have downloaded a B-ISDN protocol stack. When the user wishes to initiate a session, either a voice call or a data session using a computer, fax or videophone connected to the I/O port 17, the terminal control device 15 determines the type of session (i.e. the application) and selects the best available protocol to use (if several different data formats could support the session). The choice may take into account the cost and quality of service factors discussed in our earlier application WO 96/28947, incorporated herein by reference. Preference may be given to the network with which the mobile terminal 10 is already registered, unless this technically unsuitable (because for example a broader bandwidth is required).

At this point, the mobile terminal 10 will register, or re-register, with the selected network using the selected protocol and the session will be set up as normal. On conclusion of the session, the mobile terminal 10 is able to re-register with a different network if more suitable for a different type of session.

Other Embodiments and Modifications

It will be apparent from the foregoing that many other embodiments, or modifications or alternatives to the above disclosed embodiment, are possible. The present invention is not confined to the above described embodiment, but it extends to any and all such modifications which would be obvious to the skilled person.

Whereas, in the above described embodiments, the GSM and B-ISDN protocols have been discussed, the invention is equally intended to extend to evolutionary future modifications of these protocols, which are under discussion at the present time. However, the present invention is not limited to these protocols but it extends also to other currently known protocols such as D-AMPS, PDC, DCS 1800, and modifications thereof, whether these are based on synchronous or asynchronous protocols and to completely new protocols which may be developed.

Although the protocol code files described in the present embodiment comprise separate components for each layer, each will be apparent that the functionality of several layers could be coalesced into a single set of protocols if so desired.

Likewise, whilst in the above disclosed embodiment a protocol description in SDL is employed, it will be appreciated that a lower level representation of the protocols could be employed; for example, as C++ code, or other machine independent code.

It would also be possible, where only a single type of processor is expected to be present in mobile terminals 10, to store and download the protocol code as low level machine instructions, although this would involve a greater volume of data to transmit and would be less flexible.

Furthermore, in the above described embodiment, a processor forming part of the mobile terminal 10 is described as making the decision as to which network to select, it would equally be possible to provide a removable processor of the type referred to as subscriber identity model (SIM) in GSM at present, comprising a processor and associated memory. In this case, the terminal 10 would pass on to the SIM the country, network type and network identification information, and the SIM processor would select a network based on the type of network information (amongst other things).

Although in the above described embodiment, the information on the type of backbone network supplied is used to select a backbone network, and to download protocols for such a network, it will be appreciated that other uses of this information are also within the scope of the invention. For example, where more than one radio access network is available to the terminal 10, information broadcast by each radio access network could be used to select the required radio access network.

Although in the above described embodiment, the signals identifying the country and backbone network are transmitted on a broadcast channel, this information may alternatively be transmitted in a session established between the terminal and the radio access network.

Although in the above described embodiment, a compiler is disclosed, it will be apparent that it would be possible to provide instead an interpreter program, and to interpret the high level protocol description downloaded into the terminal rather than compiling it into an executable code file; this would have advantages in requiring less storage, but would require a higher speed processor since the interpretation would be performing continually during communications.

Although in the above described embodiment, the protocol code file is erased after a contact with a network is lost, it will be apparent that in other embodiments the downloaded protocols may be permanently retained. In such cases, an on-going payment may be made for the use of the downloaded protocol; either by charging a premium on each occasion when they are used, or by charging a substantially one-off charge on downloading.

Naturally, other embodiments and modifications will suggest themselves to the skilled person.

What I claim is:

1. A user terminal, comprising:
   a wireless interface (11, 12);
   a formatting device (13) for applying a low level signal format protocol to a signal for transmission over said wireless interface; and
   a control unit for selectively applying a plurality of alternative high level signalling protocols to said signal via said lower level protocols.

2. A terminal according to claim 1 which comprises a mobile terminal.

3. A terminal according to claim 1 in which said wireless interface (11, 12) is comprised of a radio interface.

4. A terminal according to claim 1, wherein said control unit is further operable for receiving a type signal (102) indicative of a type of high level protocols, and for selecting one of said high level protocols for application based on said received type signal.

5. A terminal according to claim 4 which is arranged to receive signal data (101, 103) and to selectively process said signal data in accordance with a selected one of said protocols depending upon said type signal (102).

6. A terminal according to claim 1, wherein said control unit is responsive to receiving new protocol data to enable the performance of a new said protocol.

7. A terminal according to claim 6, in which said control unit is coupled to the wireless interface (11, 12) to receive said new protocol data therefrom.

8. A terminal according to claim 1, wherein said control unit is further operable for receiving a type signal (102) indicative of a type of high level protocols, and for selecting one of said high level protocols for application based on said received type signal; wherein said control unit is responsive to receiving new protocol data from said wireless interface to enable the performance of a new said protocol; and wherein said control unit is arranged to generate a signal to initiate reception of new protocol data in response to a said type signal (102) corresponding to a protocol in which the terminal is unable to communicate.

9. A terminal according to claim 6, wherein said control unit is operable for causing the terminal 10 to cease to apply such new protocol data in accordance with a predetermined criterion.

10. A terminal according to claim 1, wherein said control unit is further operable for receiving a type signal (102) indicative of a type of high level protocols, and for selecting one of said high level protocols for application based on said received type signal; wherein said control unit is responsive to receiving new protocol data to enable the performance of a new said protocol; wherein said control unit is operable for causing the terminal 10 to cease to apply such new protocol data in accordance with a predetermined criterion; in which said predetermined criterion corresponds to ceasing to receive a type signal (102) corresponding to the new protocol data.

11. A terminal according to claim 9 in which said predetermined criterion comprises a predetermined time interval.

12. A terminal according to claim 6, wherein said control unit comprises a programmable processor (150, 13), and a converter (150, 155) for receiving said new protocol data in a format which is independent of the instruction set of said programmable processor (150, 13) and for generating therefrom corresponding instructions for said programmable processor (150, 13).

13. A terminal according to claim 12 in which the converter comprises a compiler (155) arranged, on reception of said new protocol data, to generate an executable program file (152) to cause said programmable processor (13) to execute said protocol.

14. A communications system for communication with a terminal (10) comprising:
   at least one user terminal comprised of a wireless interface (11, 12); a formatting device (13) for applying a low level signal format protocol to a signal for transmission over said wireless interface; and a control unit for selectively applying a plurality of alternative high level signalling protocols to said signal via said lower level protocols; and
   at least one wireless access network (20a–20c) arranged to communicate with said at least one terminal (10) using a low level signalling protocol, said wireless access network (20b) being connected to a plurality of wired networks (30a–30c) arranged to carry data using respective, mutually incompatible, higher level protocols, said wireless access network (20b) comprising, for each said wired network (30a, 30b), a respective protocol interface (23a, 23b) for translating between said higher and lower level protocols.

15. A communication system as in claim 14, wherein said wireless access network apparatus (20b) comprises a wireless communication interface (21, 22) for communicating with a mobile terminal (10) employing low level communications protocols, and said plurality of network protocol interfaces (23a, 23b) for coupling to respective different communications networks (30, 30b) employing respective different, incompatible, relatively high level communications protocols.

16. A communication system according to claim 15 and further comprising means (25) for periodically transmitting a signal (102) for each of said networks (30a, 30b) indicating the type of protocols used by that network.

17. A communication system according to claim 15, and further comprising a store (26) storing a plurality of protocol data records (261–263) each corresponding to the protocols used by one of said networks (30a, 30b); each protocol data record comprising data from which a mobile terminal (10) can reconstruct said protocols; and further comprising means (27) for reading said protocol data records and supplying data therefore to said wireless interface (20, 21) for transmission to a said mobile terminal (10).

18. A communication system according to claim 17, in which each said protocol data record (261–263) comprises a representation of said protocols which is independent of the construction of said terminal (10).

19. A communication system according to claim 18 in which said representation comprises a specification description language (SDL) representation of said protocols.

20. A user terminal, comprising:
   a wireless interface (11, 12);
   a formatting device (13) for applying a low level signal format protocol to a signal for transmission over said wireless interface; and
   a control unit for receiving a type signal (102) from said wireless interface, and for applying a high level protocol for application to said signal based on said type signal.

21. A terminal according to claim 20, and further including means for selecting a radio access network based on said received type signal.

22. A terminal according to claim 20, and further including means for selecting a backbone network based on said received type signal.

23. A method of wireless communication between a mobile terminal station (10) and a remote terminal via a radio access network (20) employing low level signalling protocols and a backbone network (30) employing high level signalling protocols, in which the radio access network (20b) is coupled to a plurality of incompatible backbone networks (30a, 30b), the method comprising steps of: providing a plurality of high level protocols at the mobile terminal station (10), selecting one of said plurality of backbone networks (30a, 30b), and, at said mobile terminal (10), selecting a corresponding protocol for use at said mobile terminal (10).

24. The method according to claim 23, further comprising the step of downloading said protocol via said radio access network (20b).

25. A method of wireless communication between a mobile terminal station (10) and a remote terminal via a radio access network (20) employing low level signalling protocols and a backbone network (30) employing high level signalling protocols, in which the radio access network (20b) is coupled to a plurality of incompatible backbone networks (30a, 30b), the method comprising steps of: receiving a type signal (102); and applying a high level protocol for application based on said type signal.

* * * * *